US012565547B2

(12) United States Patent
Nii

(10) Patent No.: US 12,565,547 B2
(45) Date of Patent: Mar. 3, 2026

(54) DISPERSANT FOR SUSPENSION POLYMERIZATION, METHOD FOR PRODUCING DISPERSANT FOR SUSPENSION POLYMERIZATION, AND METHOD FOR PRODUCING VINYL POLYMER PARTICLES

(71) Applicant: KURARAY CO., LTD., Okayama (JP)

(72) Inventor: Shinsuke Nii, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 910 days.

(21) Appl. No.: 17/778,346

(22) PCT Filed: Nov. 16, 2020

(86) PCT No.: PCT/JP2020/042542

§ 371 (c)(1),
(2) Date: May 19, 2022

(87) PCT Pub. No.: WO2021/100638

PCT Pub. Date: May 27, 2021

(65) Prior Publication Data

US 2023/0021123 A1 Jan. 19, 2023

(30) Foreign Application Priority Data

Nov. 20, 2019 (JP) ................................ 2019-209606

(51) Int. Cl.
*C08F 16/06* (2006.01)
*C08J 3/12* (2006.01)
*C09K 23/38* (2022.01)

(52) U.S. Cl.
CPC ................ *C08F 16/06* (2013.01); *C08J 3/12* (2013.01); *C09K 23/38* (2022.01); *C08J 2329/04* (2013.01)

(58) Field of Classification Search
CPC .. C08F 16/06; C08F 14/06; C08F 8/00; C08F 2/20; C08F 216/06; C08F 2/06; C08F 2/38; C08F 8/12; C08F 18/08; C08J 3/12; C08J 2329/04; C09K 23/38
See application file for complete search history.

(56) References Cited

U.S. PATENT DOCUMENTS

| | | | | |
|---|---|---|---|---|
| 2004/0186232 | A1 | 9/2004 | Shibutani | |
| 2017/0190812 | A1* | 7/2017 | Horiguchi | C08F 16/06 |
| 2017/0335030 | A1 | 11/2017 | Fukuhara | |
| 2020/0078754 | A1* | 3/2020 | Muramatsu | C08F 2/20 |
| 2020/0247915 | A1 | 8/2020 | Fukuhara et al. | |
| 2021/0395409 | A1 | 12/2021 | Fukuda et al. | |

FOREIGN PATENT DOCUMENTS

| | | | | |
|---|---|---|---|---|
| JP | 551-045189 | A | 4/1976 | |
| JP | S5145189 | A | 4/1976 | |
| JP | S61-108602 | A | 5/1986 | |
| JP | H05-105702 | A | 4/1993 | |
| JP | 2004250695 | A | 9/2004 | |
| TW | 201900693 | A | 1/2019 | |
| WO | 2016/06349 | A1 | 5/2016 | |
| WO | 2016/076349 | A1 | 5/2016 | |
| WO | WO-2018212207 | A1 * | 11/2018 | C08F 14/06 |
| WO | 2019/031461 | A1 | 2/2019 | |
| WO | 2020/184397 | A1 | 9/2020 | |

OTHER PUBLICATIONS

Extended European Search Report issued in corresponding Patent Application No. 20890166.0 dated Nov. 22, 2023.
International Search Report issued in corresponding International Patent Application No. PCT/JP2020/042542 dated Jan. 12, 2021.

* cited by examiner

*Primary Examiner* — Robert C Boyle
(74) *Attorney, Agent, or Firm* — Morgan, Lewis & Bockius LLP

(57) ABSTRACT

Provided by the present invention are a dispersant for suspension polymerization which enables production of vinyl polymer particles having a small particle diameter at a small added amount, a method for producing such a dispersant for suspension polymerization, and a method for producing vinyl polymer particles by using such a dispersant for suspension polymerization.

19 Claims, No Drawings

DISPERSANT FOR SUSPENSION POLYMERIZATION, METHOD FOR PRODUCING DISPERSANT FOR SUSPENSION POLYMERIZATION, AND METHOD FOR PRODUCING VINYL POLYMER PARTICLES

TECHNICAL FIELD

The present invention relates to a dispersant for suspension polymerization, a method for producing a dispersant for suspension polymerization, and a method for producing vinyl polymer particles.

DISCUSSION OF THE BACKGROUND

In industrial production of a vinyl polymer such as a vinyl chloride resin, suspension polymerization in which a vinyl compound such as vinyl chloride is dispersed in an aqueous medium in the presence of a dispersant (may be also referred to as "dispersion stabilizer") and polymerization is performed using an oil-soluble catalyst is widely carried out. Typical factors governing the quality of a vinyl polymer obtained by suspension polymerization of a vinyl compound include: a polymerization rate, a water-monomer ratio, a polymerization temperature, a type and amount of an oil-soluble catalyst, a type of a polymerization tank, a stirring speed of contents in the polymerization tank, a type of dispersant, and the like; of these, the type of dispersant has a great influence.

Types of performance required for a dispersant for suspension polymerization of a vinyl compound are exemplified by: [1] stably obtaining vinyl polymer particles at a small added amount, [2] obtaining vinyl polymer particles which are highly uniform and porous, and the like. The vinyl polymer particles which are highly uniform and porous have high plasticizer absorbency and superior processability. Conventionally, as a dispersant for suspension polymerization of a vinyl compound, cellulose derivatives such as methyl cellulose, carboxymethyl cellulose, and the like, as well as a partially saponified polyvinyl alcohol and the like have been used alone or in an appropriate combination.

As a dispersant for suspension polymerization containing a polyvinyl alcohol, Patent Document 1 discloses "a dispersion stabilizer for suspension polymerization of a vinyl compound, the dispersion stabilizer being constituted by a polyvinyl alcohol which has a ratio of an weight-average degree of polymerization to a number-average degree of polymerization of 3.0 or less, a carbonyl group and a vinylene group adjacent thereto in a molecule, absorbance coefficients at 280 nm and 320 nm according to ultraviolet absorption spectra of a 0.1% aqueous solution of 0.30 or more and 0.15 or more, respectively, and a ratio of the absorbance coefficient at 320 nm to that at 280 nm of 0.30 or more". Patent Document 2 discloses "a dispersion stabilizer for suspension polymerization of vinyl chloride, the dispersion stabilizer being constituted by a polyvinyl alcohol which has a degree of saponification of 75 to 85 mol %, an absorbance at a wavelength of 280 nm of a 0.1% by weight aqueous solution of 0.1 or more, a content of a carboxyl group of 0.01 to 0.15 mol %, and a cloud point of the 0.1% by weight aqueous solution of 50° C. or higher".

PRIOR ART DOCUMENTS

Patent Documents

Patent Document 1: Japanese Unexamined Patent Application, Publication No. S61-108602

Patent Document 2: Japanese Unexamined Patent Application, Publication No. H5-105702

SUMMARY OF THE INVENTION

Problems to be Solved by the Invention

With the conventional dispersants for suspension polymerization (dispersion stabilizers for suspension polymerization), satisfactory performance in terms of the above-mentioned requirements [1] and [2] cannot necessarily be obtained. In particular, in a case in which the amount of the dispersant to be added is small, it is difficult to stably perform suspension polymerization, and there is an inconvenience that the particle diameter of obtained vinyl polymer particles becomes large.

The present invention was made to solve the aforementioned problems, and an object of the invention is to provide a dispersant for suspension polymerization which enables production of vinyl polymer particles having a small particle diameter at a small added amount, a method for producing such a dispersant for suspension polymerization, and a method for producing vinyl polymer particles by use of such a dispersant for suspension polymerization.

Means for Solving the Problems

The aforementioned problems are solved by the following.

[1] A dispersant for suspension polymerization, wherein the dispersant is a powder which contains a vinyl alcohol polymer having a structure represented by the following formula 1 and has an average particle diameter of 100 μm or more 2,000 μm or less, the dispersant contains particles A which have a particle diameter of 500 μm or more and particles B which have a particle diameter of 220 μm or less, and a ratio (A/B) of an absorbance A of a 0.10% by mass aqueous solution of the particles A at an optical path length of 10 mm and a wavelength of 320 nm to an absorbance B of a 0.1% by mass aqueous solution of the particles B at the optical path length of 10 mm and the wavelength of 320 nm is 0.7 or more and 1.2 or less,

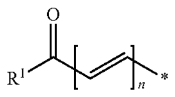

1 wherein, in the above formula 1, $R^1$ represents an alkyl group having 1 to 4 carbon atoms; n is an integer of 1 to 10; and * denotes a site bonding to a part other than the structure represented by the above formula 1 in the vinyl alcohol polymer.

[2] The dispersant for suspension polymerization according to [1], wherein an average value PA of a roundness P, represented by the following formula 2, of 50 particles arbitrarily extracted from the particles of the dispersant which have a particle diameter of 100 μm or more and 1,000 μm or less is 0.1 or more and 0.8 or less:

$$P=\left(\sum_{i=1}^{N} r_i\right)/NR \quad 2$$

wherein, in the above formula 2, $r_i$ represents a radius of curvature of each corner of a particle of the 50 particles arbitrarily extracted; R represents a radius of a maximum inscribed circle of the particle; and N represents a number of corners of the particle, wherein in a case in which the number of corners of the particle is 9 or more, the radii of curvature of eight corners, in increasing order from a smallest radius of curvature, are adopted, and N is set to 8.

[3] The dispersant for suspension polymerization according to [1] or [2], wherein the vinyl alcohol polymer has a viscosity-average degree of polymerization of 500 or more and 1,500 or less, and a degree of saponification of 60 mol % or more and 90 mol % or less.

[4] The dispersant for suspension polymerization according to any one of [1] to [3], wherein a 0.1% by mass aqueous solution of the vinyl alcohol polymer has an absorbance at the optical path length of 10 mm and a wavelength of 280 nm of 0.05 or more, and an absorbance at the optical path length of 10 mm and the wavelength of 320 nm of 0.05 or more.

[5] The dispersant for suspension polymerization according to any one of [1] to [4], wherein a percentage content of particles which have a particle diameter of 100 μm or more and 1,000 μm or less is 50% by mass or more.

[6] A method for producing the dispersant for suspension polymerization according to any one of [1] to [5], the method including:

grinding a resin solid containing the vinyl alcohol polymer to obtain a coarse powder; and processing surfaces of the coarse powder while heating.

[7] A method for producing vinyl polymer particles, the method including subjecting a vinyl compound to suspension polymerization using the dispersant for suspension polymerization according to any one of [1] to [5].

Effects of the Invention

According to the present invention, a dispersant for suspension polymerization which enables production of vinyl polymer particles having a small particle diameter at a small added amount, a method for producing such a dispersant for suspension polymerization, and a method for producing vinyl polymer particles by use of such a dispersant for suspension polymerization can be provided.

DESCRIPTION OF EMBODIMENTS

Dispersant for Suspension Polymerization

A dispersant for suspension polymerization of one embodiment of the present invention (hereinafter, may be also referred to as "dispersant") is a powder which contains a vinyl alcohol polymer (hereinafter, may be also referred to as "PVA (polyvinyl alcohol)") having a structure represented by the following formula 1 and has an average particle diameter of 100 μm or more and 2,000 μm or less. The dispersant contains particles A which have a particle diameter of 500 μm or more and particles B which have a particle diameter of 220 μm or less (212 μm or less). A ratio (A/B) of an absorbance A of a 0.1% by mass aqueous solution of the particles A at an optical path length of 10 mm and a wavelength of 320 nm to an absorbance B of a 0.10% by mass aqueous solution of the particles B at the optical path length of 10 mm and the wavelength of 320 nm is 0.7 or more and 1.2 or less.

1

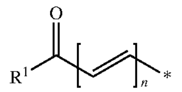

In the above formula 1, $R^1$ represents an alkyl group having 1 to 4 carbon atoms; n is an integer of 1 to 10; and * denotes a site bonding to a part other than the structure represented by the above formula 1 in the vinyl alcohol polymer.

It is to be noted that herein, numerical value ranges described using the term "to" mean that the numerical values provided before and after the term "to" are respectively included as the lower limit and the upper limit.

According to the dispersant of the one embodiment of the present invention, in suspension polymerization of a vinyl compound, vinyl polymer particles having a small particle diameter can be produced at a small added amount. Although not clarified and without wishing to be bound by any theory, the reason for such an effect is presumed to be as follows. Typically, a conventional dispersant constituted by a PVA is produced in such a manner that particles (or a powder) of a PVA having a carbonyl group are produced, and then the particles of the PVA are subjected to a heat treatment. Owing to a dehydration reaction in the heat treatment, a $—CO—(CH{=}CH)_n—$ structure is formed in the PVA. Accordingly, in such a dispersant obtained through a heat treatment, an absorption appears at a wavelength of 320 nm, which is attributed to a $—CO—(CH{=}CH)_3—$ structure in the PVA. Here, in a case in which the method of the conventional heat treatment is employed, the quantity of the $—CO—(CH{=}CH)_n—$ structure formed differs greatly between PVA particles having a large particle diameter and PVA particles having a small particle diameter, perhaps due to low uniformity of the heat treatment. Specifically, there is a tendency that the PVA particles having a small particle diameter are more likely to be subjected to the heat treatment, whereby more $—CO—(CH{=}CH)_n—$ structures are formed therein. In a case in which such a conventional dispersant is used, differences in physical properties and the like between the PVA contained in the particles having a large particle diameter and the PVA contained in the particles having a small particle diameter causes non-uniformity of a state of dispersion, reactivity and the like of the vinyl compound. As a result, it is considered that owing to formation of coarse polymer particles and/or the like, the particle diameter (average particle diameter) of vinyl polymer particles to be obtained is increased. On the other hand, in the dispersant of the one embodiment of the present invention, the absorbance A of the particles A, which have a relatively large particle diameter, at the wavelength of 320 nm is substantially at the same level as the absorbance B of the particles B, which have a relatively small particle diameter, at the wavelength of 320 nm, whereby the ratio (A/B) between these two absorbances is close to 1. This means that the PVA contained in the particles A, which have a relatively large particle diameter, and the PVA contained in the particles B, which have a relatively small particle diameter, include the $—CO—(CH{=}CH)_n—$ structure at substantially the same amount, and differences in physical properties and the like are small. Therefore, in a case in which the dispersant of the one embodiment of the present invention is used, a highly uniform reaction occurs, and thus stable suspension polymerization can be performed. As a result, it is considered that owing to less likelihood of generation of coarse polymer particles or the like, the particle diameter (average particle diameter) of the vinyl polymer particles to be obtained is reduced. It is to be noted that the dispersant of the one embodiment of the present invention can be effectively produced by a production method described later. Hereinafter, the dispersant of the one embodiment of the present invention is described in detail.

PVA Having Structure Represented by Formula 1

The PVA having the structure represented by the formula 1 is an essential component of the dispersant of the one embodiment of the present invention. In the formula 1, $R^1$ represents an alkyl group having 1 to 4 carbon atoms, preferably an alkyl group having 1 to 3 carbon atoms, and more preferably an alkyl group having 1 or 2 carbon atoms. Examples of the alkyl group having 1 to 4 carbon atoms represented by $R^1$ in the formula 1 include a methyl group, an ethyl group, a propyl group, and the like, and a methyl group and an ethyl group are preferred. In the formula 1, n may be, for example, an integer of 1 to 6, and may be an integer of 1 to 4. The structure represented by the formula 1 can be effectively introduced into a polymer in such a manner that in polymerization of a vinyl ester polymer which serves a precursor, the polymer is heated using an aldehyde or a ketone as a chain transfer agent (modifier), as described later.

The PVA is a polymer having vinyl alcohol units as monomer units. The PVA is typically obtained by saponifying a vinyl ester polymer. The lower limit of a degree of saponification of the PVA may be, for example, 40 mol % or 50 mol %, and is preferably 50 mol %, more preferably 60 mol %, and still more preferably 68 mol %. On the other hand, the upper limit of the degree of saponification may be 100 mol % or 99 mol %, and is preferably 98 mol %, more preferably 95 mol %, still more preferably 90 mol %, even more preferably 85 mol %, and particularly preferably 80 mol %. When the degree of saponification of the PVA falls within the above range, owing to suitable surface active performance or the like, vinyl polymer particles having a smaller particle diameter can be produced. Furthermore, when the degree of saponification is equal to or less than the upper limit, the surface active performance is improved, and a plasticizer absorbency of the vinyl polymer particles to be obtained is increased. The degree of saponification is a value measured according to a method described in JIS K6726: 1994.

The PVA may have an other monomer unit aside from the vinyl alcohol units and vinyl ester units. Examples of a monomer that gives the other monomer unit include: α-olefins such as ethylene, propylene, 1-butene, isobutene, and 1-hexene; acrylic acid and methacrylic acid; acrylic acid esters such as methyl acrylate and ethyl acrylate; methacrylic acid esters such as methyl methacrylate and ethyl methacrylate; acrylamide derivatives such as N-methylacrylamide and N-ethylacrylamide; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether, and n-butyl vinyl ether; hydroxy group-containing vinyl ethers such as ethylene glycol vinyl ether, 1,3-propanediol vinyl ether, and 1,4-butanediol vinyl ether; allyl acetate; allyl ethers such as propyl allyl ether, butyl allyl ether, and hexyl allyl ether; oxyalkylene group-containing monomers; isopropenyl acetate; hydroxy group-containing α-olefins such as 3-buten-1-ol, 4-penten-1-ol, 5-hexen-1-ol, 7-octen-1-ol, 9-decen-1-ol, and 3-methyl-3-buten-1-ol; silyl group-containing monomers such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide propyltrimethoxysilane, and 3-(meth)acrylamide propyltriethoxysilane; and the like. Of these, the α-olefins, acrylic acid, methacrylic acid, the acrylic acid esters, and the methacrylic acid esters are preferred.

A proportion of the other monomer units in total monomer units in the PVA may be preferably 20 mol % or less, and may be more preferably 10 mol % or less. On the other hand, the proportion of the other monomer units may be, for example, 0.1 mol % or more, and may be 1 mol % or more.

The lower limit of a viscosity-average degree of polymerization of the PVA may be, for example, 200, 300, or 400, and is preferably 500, more preferably 600, and still more preferably 700. When the viscosity-average degree of polymerization is equal to or more than the lower limit, a protective colloid property is increased, and vinyl polymer particles having a smaller particle diameter can be produced. On the other hand, the upper limit of the viscosity-average degree of polymerization may be, for example, 3,000 or 2,000, and is preferably 1,800, more preferably 1,700, even more preferably 1,500, still more preferably 1,300, and particularly preferably 1,100. When the viscosity-average degree of polymerization is equal to or less than the upper limit, the surface active performance is improved, the plasticizer absorbency of the vinyl polymer particles to be obtained is increased, and furthermore, vinyl polymer particles having a smaller particle diameter can be produced. The viscosity-average degree of polymerization is a value measured according to JIS K6726: 1994. Specifically, the viscosity-average degree of polymerization can be determined by the following formula using a limiting viscosity [η] (L/g) measured in water at 30° C. for the PVA after being re-saponified to give the degree of saponification of 99.5 mol % or more and purified.

$$\text{Viscosity-average degree of polymerization} = ([\eta] \times 10^4/8.29)^{(1/0.62)}$$

The lower limit of an absorbance (UV 280 nm) of a 0.1% by mass aqueous solution of the PVA at the optical path length of 10 mm and a wavelength of 280 nm is preferably 0.05, more preferably 0.1, and still more preferably 0.2. The absorption at the wavelength of 280 nm is attributed to a $-CO-(CH{=}CH)_2-$ structure in the PVA. Furthermore, the lower limit of an absorbance (UV 320 nm) of the 0.1% by mass aqueous solution of the PVA at the optical path length of 10 mm and the wavelength of 320 nm is preferably 0.05, more preferably 0.1, and still more preferably 0.2. As described above, the absorption at the wavelength of 320 nm is attributed to the $-CO-(CH{=}CH)_3-$ structure in the PVA. In a case in which the absorbance (UV 280 nm) and the absorbance (UV 320 nm) are equal to or more than the lower limit, it can be said that a sufficient amount of the structure represented by the above formula 1 is formed, and vinyl polymer particles having a smaller particle diameter can be produced. It is to be noted that the upper limit of the absorbance (UV 280 nm) is not particularly limited and is typically 10, and may be preferably 8, 5, 3, 1, or 0.5. Furthermore, the upper limit of the absorbance (UV 320 nm) is not particularly limited and is typically 10, and may be preferably 8, 5, 3, 1, or 0.5.

The lower limit of a content of the PVA in nonvolatile components of the dispersant of the one embodiment of the present invention is preferably 30% by mass and more preferably 50% by mass, and may be still more preferably 70% by mass, 90% by mass, or 99% by mass. The upper limit of the content of the PVA in the nonvolatile components of the dispersant of the one embodiment of the present invention may be 100% by mass. The nonvolatile components other than the PVA which may be contained in the dispersant of the one embodiment of the present invention are exemplified by additives such as PVAs other than the PVA having the structure represented by the above formula 1, resins other than the PVA, and surfactants and plasticizers; various compounds used during production; and the like. The lower limit of a content of all the PVAs (the PVA having the structure represented by the above formula 1 and the other PVAs) in the nonvolatile components of the dispersant of the one embodiment of the present invention is preferably 50% by mass and more preferably 70% by mass, and may be still more preferably 80% by mass, 90% by mass, or 99% by mass. The upper limit of the content of all the PVAs in the nonvolatile components of the dispersant of the one embodiment of the present invention may be 100% by mass. Furthermore, a content of volatile components in the dispersant of the one embodiment of the present invention is typically 20% by mass or less, and is preferably 15% by mass or less and more preferably 10% by mass or less. The volatile components which may be contained in the dispersant of the one embodiment of the present invention are exemplified by alcohols, water, and the like.

Shape, Absorbance Ratio, etc.

The dispersant of the one embodiment of the present invention is a powder having an average particle diameter of 100 μm or more and 2,000 μm or less. The lower limit of the average particle diameter is preferably 150 μm, and more preferably 200 μm. On the other hand, the upper limit of the average particle diameter is preferably 1,500 μm, more preferably 1,000 μm, and still more preferably 800 μm. In a case in which the average particle diameter falls within the above range, owing to the powder being more uniformly subjected to the heat treatment, the solubility being favorable, and the like, vinyl polymer particles having a smaller particle diameter can be produced. Furthermore, due to the average particle diameter being equal to or more than the lower limit, a dust explosion is less likely to occur, whereby safety is improved. The average particle diameter of the dispersant is a value measured according to a method described in JIS K7369: 2009.

In the dispersant of the one embodiment of the present invention, a percentage content of particles which have a particle diameter of 100 to 1,000 μm (specifically, a particle diameter of 106 to 1,000 μm) is not particularly limited, and is preferably 50% by mass or more, more preferably 55% by mass or more, still more preferably 60% by mass or more, and even more preferably 65% by mass or more. On the other hand, the upper limit of the percentage content of the particles which have the particle diameter of 100 to 1,000 μm may be 100% by mass, and may be 95% by mass. In a case in which the percentage content of the particles which have the particle diameter of 100 to 1,000 μm falls within the above range, owing to the powder being more uniformly subjected to the heat treatment, the solubility being favorable, and the like, vinyl polymer particles having a smaller particle diameter can be produced. The percentage content of the particles which have the particle diameter of 100 to 1,000 μm in the dispersant can be determined according to a method described in JIS K7369: 2009, using a sieve screen which has a nominal mesh opening size of 1,000 μm (16 mesh) and a sieve screen which has a nominal mesh opening size of 106 μm (150 mesh).

The dispersant of the one embodiment of the present invention contains the particles A which have the particle diameter of 500 μm or more and the particles B which have the particle diameter of 220 μm or less (specifically, 212 μm or less). The particles B may be particles which have the particle diameter of 212 μm or less. The lower limit of the ratio (A/B) of the absorbance A of the 0.1% by mass aqueous solution of the particles A at the optical path length of 10 mm and the wavelength of 320 nm to the absorbance B of the 0.1% by mass aqueous solution of the particles B at the optical path length of 10 mm and the wavelength of 320 nm is 0.7, preferably 0.75, more preferably 0.8, still more preferably 0.82, even more preferably 0.85, particularly preferably 0.88, and most preferably 0.90. Furthermore, the upper limit of the ratio (A/B) is 1.2, preferably 1.1, more preferably 1.05, still more preferably 1.03, and particularly preferably 1.0. In a case in which the absorbance ratio (A/B) falls within the above range, it can be said that a highly uniform heat treatment was performed, and variance of the amount of the structure represented by the above formula 1 which is formed in the PVA of each dispersant particle is small. Thus, due to the absorbance ratio (A/B) falling within the above range, vinyl polymer particles having a small particle diameter can be produced.

The lower limit of the absorbance A of the 0.1% by mass aqueous solution of the particles A at the optical path length of 10 mm and the wavelength of 320 nm is preferably 0.05, more preferably 0.1, still more preferably 0.15, and particularly preferably 0.2. Furthermore, the upper limit of the absorbance A is not particularly limited, and is typically 10, and may be preferably 8, 5, 3, 1, or 0.5.

The lower limit of the absorbance B of the 0.1% by mass aqueous solution of the particles B at the optical path length of 10 mm and the wavelength of 320 nm is preferably 0.05, more preferably 0.1, still more preferably 0.15, and particularly preferably 0.2. Furthermore, the upper limit of the absorbance B is not particularly limited, and is typically 10, and may be preferably 8, 5, 3, 1, or 0.5.

It is to be noted that in the sieving, the particles A which have the particle diameter of 500 μm or more can be sorted out as particles which did not pass through a sieve screen which has a nominal mesh opening size of 500 μm. In the sieving, the particles B which have the particle diameter of 220 μm or less (specifically, 212 μm or less) can be sorted out as particles which passed through a sieve screen which has a nominal mesh opening size of 212 μm. The mechanical sieving can be performed, for example, by a method described in JIS K7369: 2009.

In the dispersant of the one embodiment of the present invention, an average value PA of a roundness P (hereinafter, may be also referred to as "average roundness") of 50 particles arbitrarily extracted from particles which have a particle diameter of 100 μm or more and 1,000 μm or less is preferably 0.1 or more and 0.8 or less, wherein P is represented by the following formula 2.

$$P=\left(\sum_{i=1}^{N} r_i\right)/NR \qquad 2$$

In the above formula 2, $r_i$ represents a radius of curvature of each corner of a particle of the 50 particles arbitrarily extracted; R represents a radius of a maximum inscribed circle of the particle; and N represents a number of corners of the particle, wherein in a case in which the number of corners of the particle is 9 or more, radii of curvature of eight corners, in increasing order from a smallest radius of curvature, are adopted, and N is set to 8.

The present inventors have found that by subjecting a coarse powder containing the PVA to a heat treatment (surface processing while heating) that results in an increase in average roundness, as described later, a highly uniform heat treatment is performed regardless of the size of the particle diameter, and a dispersant for suspension polymerization which has the absorbance ratio (A/B) close to 1 is obtained. Accordingly, in a case in which the average roundness of the dispersant of the one embodiment of the present invention is preferably 0.1 or more, more preferably 0.15 or more, still more preferably 0.20 or more, even more preferably 0.22 or more, even more preferably 0.25 or more, even more preferably 0.28 or more, and particularly preferably 0.30 or more, vinyl polymer particles having a smaller particle diameter can be produced. On the other hand, in light of productivity and the like, the average roundness is preferably 0.8 or less, and more preferably 0.7 or less.

Furthermore, in a case in which the average roundness of the dispersant of the one embodiment of the present invention is equal to or more than the lower limit, the dispersant is less likely to generate a dispersant clog in pipes and/or silos when performing transportation through pipes, packing through silos, and the like. Although not necessarily clarified and without wishing to be bound by any theory, the reason for this effect is presumed to be that by virtue of each particle having rounded corners, friction upon the particles coming into contact with each other and friction upon the particles coming into contact with a wall surface or the like are low, and as a result, flowability of the particles is improved.

The average roundness of the dispersant can be determined by the following method. Fifty particles are arbitrarily extracted from the particles of the dispersant which have a particle diameter of 100 to 1,000 μm (specifically, a particle diameter of 106 to 1,000 μm). In the sieving, the particles which have the particle diameter of 100 to 1,000 μm can be sorted out as particles which passed through a sieve screen which has a nominal mesh opening size of 1,000 μm, and did not pass through a sieve screen which has a nominal mesh opening size of 106 μm. The sieving can be performed, for example, by a method described in JIS K7369: 2009. With regard to one particle of the 50 particles arbitrarily extracted, with respect to a projection drawing with a maximum apparent area, eight corners in increasing order from a smallest radius of curvature $r_i$ (in a case in which there are less than 8 corners, all of the corners) are extracted, and the radius of curvature $r_i$ of each corner is measured. Furthermore, based on the projection drawing with the maximum apparent area, a radius R of a maximum inscribed circle of the particle is measured. The number of corners of the particle is defined as N (in a case in which the number of corners of the particle is 9 or more, N is set to 8), and based on the $r_i$ and R which have been measured, the roundness P of the one particle is determined by the above formula 2. A case in which the roundness P is low indicates that the particle has many angular corners, and a case in which the roundness P is high indicates that the particle is rounded. The roundness P of the 50 particles extracted is measured, and the average value PA of the roundness P of the 50 particles is determined. The average value PA corresponds to the average roundness.

Method for Producing Dispersant for Suspension Polymerization

A method for producing a dispersant of an other embodiment of the present invention is not particularly limited, and the following method is preferred. More specifically, the method for producing a dispersant of the other embodiment of the present invention includes:

a step (Step B) of grinding a resin solid containing a PVA to obtain a coarse powder; and a step (Step C) of processing surfaces of the coarse powder while heating.

The method for producing a dispersant for suspension polymerization of the other embodiment of the present invention may further include a step (Step A) of synthesizing a PVA to obtain a resin solid containing the PVA.

Step A

Step A may include, for example, a polymerizing step, a saponifying step, and/or the like.

In the polymerizing step, a vinyl ester monomer is polymerized to give a vinyl ester polymer. The procedure of polymerizing the vinyl ester monomer is exemplified by a well-known procedure such as a bulk polymerization procedure, a solution polymerization procedure, a suspension polymerization procedure, an emulsion polymerization procedure, and the like. Of these procedures, the bulk polymerization procedure performed without a solvent and the solution polymerization procedure performed with a solvent such as an alcohol or the like are preferred, and the solution polymerization procedure in which the polymerization is performed in the presence of a lower alcohol is more preferred. The lower alcohol is preferably an alcohol having 3 or fewer carbon atoms; more preferably methanol, ethanol, n-propanol, or isopropanol; and still more preferably methanol. In carrying out a polymerization reaction by the bulk polymerization procedure or the solution polymerization procedure, in terms of a reaction system, either of a batch-wise system or a continuous system can be employed.

Examples of the vinyl ester monomer include vinyl formate, vinyl acetate, vinyl propionate, vinyl valerate, vinyl caprate, vinyl laurate, vinyl stearate, vinyl benzoate, vinyl pivalate, vinyl versatate, and the like. Of these, vinyl acetate is preferred.

A polymerization initiator to be used in the polymerization reaction is exemplified by well-known polymerization initiators, e.g., azo initiators such as 2,2'-azobisisobutyronitrile, 2,2'-azobis(2,4-dimethylvaleronitrile), and 2,2'-azobis (4-methoxy-2,4-dimethylvaleronitrile); organic peroxide initiators such as benzoyl peroxide, n-propyl peroxycarbonate, and diisopropyl peroxydicarbonate; and the like. A polymerization temperature at a time of conducting the polymerization reaction is not particularly limited, and a range of 5° C. or higher and 200° C. or lower is appropriate.

In polymerizing the vinyl ester monomer, copolymerizable monomer(s) can be further copolymerized within a range not impairing the principles of the present invention. Examples of the copolymerizable monomer include vinyl alcohol units which may be contained in the PVA represented by the formula 1, and the monomers exemplified above as the monomer that gives the other monomer unit aside from the vinyl ester units.

The PVA synthesized in Step A preferably contains a PVA having a structure represented by $R^1$—CO— ($R^1$ represents an alkyl group having 1 to 4 carbon atoms) as a terminal structure. In light of efficient yield of the PVA, in the polymerization of the vinyl ester monomer, a chain transfer agent (modifier) such as an aldehyde represented by $R^2$—CHO ($R^2$ represents an alkyl group having 1 to 4 carbon atoms) or a ketone represented by $R^3$—CO—$R^4$ ($R^3$ and $R^4$ each independently represent an alkyl group having 1 to 4 carbon atoms) is preferably also present. Examples of the chain transfer agent include: aldehydes such as acetaldehyde, propionaldehyde, and butylaldehyde; and ketones such as acetone and methyl ethyl ketone. These chain transfer agents may be used alone of one type, or in a combination of two or more types thereof. Furthermore, in the polymerization of the vinyl ester monomer, a chain transfer agent other than the above-mentioned aldehydes and ketones may further be also present for the purpose of adjusting the degree of polymerization of the PVA to be obtained. Examples of the chain transfer agent include: aldehydes other than the above-mentioned aldehydes; ketones other than the above-mentioned ketones; mercaptans such as 2-hydroxyethanethiol; thiocarboxylic acids such as thioacetic acid; halogenated hydrocarbons such as trichloroethylene and perchloroethylene; and the like. An amount of the chain transfer agent to be added is determined according to the chain transfer constant of the chain transfer agent to be added, the target degree of polymerization of the PVA, and the like. Typically, the amount is preferably 0.1 to 10% by mass with respect to the vinyl ester to be used.

In the saponifying step, the vinyl ester polymer is saponified in an alcohol solution using an alkali catalyst or an acid catalyst to obtain the PVA. For the saponification reaction of the vinyl ester polymer, an alcoholysis or hydrolysis reaction using a conventionally well-known basic catalyst such as sodium hydroxide, potassium hydroxide, or sodium methoxide, or an acid catalyst such as p-toluenesulfonic acid can be adopted. Examples of the solvent to be used in the saponification reaction include: alcohols such as methanol and ethanol; esters such as methyl acetate and ethyl acetate; ketones such as acetone and methyl ethyl ketone; aromatic hydrocarbons such as benzene and toluene; and the like. These can be used alone, or in a combination of two or more types thereof. Of these, due to convenience, it is preferable to use methanol or a mixed solution of methanol and methyl acetate as the solvent, and to conduct the saponification reaction in the presence of sodium hydroxide which serves as the basic catalyst.

The saponifying step can be conducted using a belt type reactor, a kneader type reactor, a tower type reactor, or the like. By going through the saponifying step, the resin solid containing the PVA is obtained. A proportion of nonvolatile components in the resin solid accounted for by the PVA is, for example, 50% by mass or more, preferably 70% by mass or more, and more preferably 90% by mass or more, and may be still more preferably 99% by mass or more. With regard to the nonvolatile components in the resin solid, the PVA may be substantially the principal component, and/or impurities such as sodium acetate, byproducts, and the like may be contained.

Step B

In Step B, the resin solid containing the PVA is ground. The PVA in the resin solid to be subjected to Step B is preferably a PVA which has a carbonyl group in the terminal structure. Specifically, the PVA which has the structure represented by $R^1$—CO— ($R^1$ represents an alkyl group having 1 to 4 carbon atoms) as the terminal structure is preferred. By using such a PVA which has a carbonyl group in the terminal structure, the PVA having the structure represented by the above formula 1 is effectively obtained through a heat treatment in Step C. As described above, the PVA which has the structure represented by $R^1$—CO— ($R^1$ represents an alkyl group having 1 to 4 carbon atoms) is obtained by, for example, saponifying the vinyl ester polymer obtained using the aldehyde or the ketone as the chain transfer agent (modifier).

By grinding the resin solid containing the PVA, a coarse powder containing the PVA is obtained. The grinding may be performed using a well-known grinder. With regard to the grinder, a device which enables controlling an extent of the grinding, e.g., grinding strength, is preferred in order to adjust the average particle diameter and the like of the coarse powder to be obtained and the dispersant to be finally obtained. Other than adjusting the grinding strength, the average particle diameter and the like of the coarse powder to be obtained can also be controlled by a processing time period and the like. It is to be noted that the coarse powder obtained may be subjected to a re-saponifying treatment. Furthermore, the coarse powder obtained may be subjected to: a washing treatment for reducing impurities such as sodium acetate, byproducts, and the like; a drying treatment for reducing volatile components; and the like. The resin solid before grinding may be subjected to the washing treatment and/or the drying treatment.

Step C

In Step C, the surfaces of the coarse powder are processed while the coarse powder is heated. In the case in which the resin solid containing the PVA was ground, the coarse powder obtained will have a form in which the corners are very angular. In a case in which such a coarse powder is simply subjected to a heat treatment, an extent of the heat treatment greatly varies between and within particles, whereby it is difficult to obtain the dispersant for suspension polymerization of the one embodiment of the present invention, in which the ratio of the absorbance A to the absorbance B is close to 1. Thus, by Step C, the processing (polishing or the like) is conducted such that the corners are rounded, while performing the heat treatment on the coarse powder, whereby a highly uniform heat treatment is performed. It can also be said that Step C is a step of performing a heat treatment on the coarse powder while conducting a processing such as polishing such that the corners are rounded. Furthermore, through such a Step C, a dispersant having a high average roundness is obtained.

A device to be used in Step C is exemplified by a device which enables polishing or the like of the surfaces of the coarse powder while heating the coarse powder, such as a rotary kiln in which a filling container for the powder rotates and surface polishing advances due to particles of the powder coming in contact with each other; a planetary mixer which enables subjecting contents to three-dimensional motion by screw blades which rotate and revolve within the container; a mixer in which paddles or screws within a container rotate and an internal powder is polished by the revolution; and the like. Examples of the mixer include a Lodige mixer, a Pam Apex mixer, a ribbon mixer, and the like. Of these, in light of processing efficiency, the mixer is preferred, and the Lodige mixer is more preferred.

A processing time period and a processing temperature in Step C are appropriately adjusted in accordance with the device to be used and the like. The processing time period may be, for example, 10 min or longer and 20 hrs or shorter, and may be 30 min or longer and 12 hrs or shorter. The processing temperature may be, for example, 60° C. or higher and 160° C. or lower, and may be 80° C. or higher and 140° C. or lower. It is to be noted that when the processing time period is long and the processing temperature is high, there is a tendency for the heat treatment to advance and the absorbance at the wavelength of 280 nm and the absorbance at the wavelength of 320 nm to become high.

With regard to the method for producing a dispersant for suspension polymerization of the other embodiment of the present invention, in addition to the above-described steps, for example, a sieving step for adjusting the average particle diameter may be provided. Furthermore, after Step C, a washing treatment and/or a drying treatment may be performed.

Method for Producing Vinyl Polymer Particles

A method for producing vinyl polymer particles of still another embodiment of the present invention includes a step of subjecting a vinyl compound to suspension polymerization using the dispersant of the one embodiment of the present invention. The production method is similar to well-known methods for producing vinyl polymer particles, except that the dispersant of the one embodiment of the present invention is used as a dispersant.

In the method for producing vinyl polymer particles of the still another embodiment of the present invention, typically, a vinyl compound is subjected to suspension polymerization in an aqueous medium using the dispersant of the one embodiment of the present invention. As the aqueous medium, aside from pure water, an aqueous solution containing various types of additive components, or an aqueous medium containing another organic solvent may be used.

In the suspension polymerization of the vinyl compound, an amount of the dispersant of the one embodiment of the present invention to be added on a mass basis with respect to the vinyl compound is not particularly limited, and is preferably 100 ppm or more and 50,000 ppm or less, and more preferably 200 ppm or more and 20,000 ppm or less, and may be still more preferably 10,000 ppm or less, 5,000 ppm or less, or 2,000 ppm or less. By using the dispersant of the one embodiment of the present invention, vinyl polymer particles having a small particle diameter can be obtained even at such a small amount of the dispersant to be added.

The dispersant of the one embodiment of the present invention may be used alone, or in combination with an other dispersant. The other dispersant is exemplified by water-soluble cellulose ethers such as methyl cellulose, hydroxyethyl cellulose, hydroxypropyl cellulose, and hydroxypropyl methyl cellulose; water-soluble polymers such as polyvinyl alcohol and gelatin; oil-soluble emulsifiers such as sorbitan monolaurate, sorbitan trioleate, glycerin tristearate, and ethylene oxide-propylene oxide block copolymer; water-soluble emulsifiers such as polyoxyethylene sorbitan monolaurate, polyoxyethylene glycerin oleate, and sodium laurate; and the like, which are typically used in suspension polymerization of a vinyl compound in an aqueous medium.

As a polymerization initiator to be used in the method for producing vinyl polymer particles of the still another embodiment of the present invention, a polymerization initiator which is conventionally used in polymerization of a vinyl compound may be used; specifically, a polymerization initiator similar to those exemplified in the description of the polymerization of the vinyl ester monomer may be used.

In the method for producing vinyl polymer particles of the still another embodiment of the present invention, various other types of additives may be added to a polymerization system as necessary. Examples of the additives include: polymerization modifiers such as aldehydes, halogenated hydrocarbons, and mercaptans; polymerization inhibitors such as a phenol compound, a sulfur compound, and an N-oxide compound; and the like. Furthermore, a pH adjuster, a scale inhibitor, a cross-linking agent, and/or the like may also be added. A plurality of the above-mentioned additives may be used in combination.

Examples of the vinyl compound which can be subjected to the suspension polymerization in the method for producing vinyl polymer particles of the still another embodiment of the present invention include: halogenated vinyls such as vinyl chloride; vinyl esters such as vinyl acetate and vinyl propionate; acrylic acid, methacrylic acid, and esters and salts thereof, maleic acid, fumaric acid, and esters and anhydrides thereof; styrene; acrylonitrile; vinylidene chloride; vinyl ether; and the like. Of these vinyl compounds, vinyl chloride is preferred. The method for producing vinyl polymer particles of the still another embodiment of the present invention is particularly suitably used in suspension polymerization of vinyl chloride alone, or suspension polymerization of vinyl chloride and a monomer copolymerizable with the vinyl chloride. Examples of the monomer copolymerizable with the vinyl chloride include: vinyl esters such as vinyl acetate and vinyl propionate; (meth)acrylic acid esters such as methyl (meth)acrylate and ethyl (meth) acrylate; α-olefins such as ethylene and propylene; unsaturated dicarboxylic acids such as maleic anhydride and itaconic acid; acrylonitrile; styrene; vinylidene chloride; vinyl ether; and the like.

In the suspension polymerization of the vinyl compound in the method for producing vinyl polymer particles of the still another embodiment of the present invention, a charging proportion of each component, a polymerization temperature, a polymerization time period, and the like may be similar to conditions that have been conventionally adopted in suspension polymerization of a vinyl compound such as vinyl chloride. Furthermore, there is no restriction on a charging order and a ratio of the vinyl compound, the polymerization initiator, the dispersant, the aqueous medium, and other additives.

EXAMPLES

Hereinafter, the present invention is explained in detail by way of Examples, but the present invention is not in any way limited to these Examples. It is to be noted that each measurement method and each evaluation method adopted in the following Examples and Comparative Examples are indicated below.

[Viscosity-Average Degree of Polymerization of PVA]

The viscosity-average degree of polymerization of each PVA was measured according to JIS K6726: 1994. Specifically, in a case of the PVA having a degree of saponification of less than 99.5 mol %, the viscosity-average degree of polymerization was determined by the following formula using a limiting viscosity [η] (L/g) measured in water at 30° C. for the PVA obtained after being saponified to give the degree of saponification of 99.5 mol % or more.

$$\text{Viscosity-average degree of polymerization}=([\eta]\times 10^4/8.29)^{(1/0.62)}$$

[Degree of Saponification of PVA]

The degree of saponification of each PVA was determined by a method described in JIS K6726: 1994.

[Average Particle Diameter of Dispersant for Suspension Polymerization and Percentage Content of Particles Having Particle Diameter of 100 to 1,000 μm]

Using a JIS standard sieve, the average particle diameter of the dispersant for suspension polymerization and the percentage content of particles which have a particle diameter of 100 to 1,000 μm (specifically, a particle diameter of 106 to 1,000 μm) were determined by a method described in JIS K7369: 2009.

[Average Roundness of Dispersant for Suspension Polymerization]

By the above-described sieving, particles which have the particle diameter of 100 to 1,000 μm (specifically, the particle diameter of 106 to 1,000 μm) were sorted out, and 50 particles were arbitrarily extracted from these particles. With respect to each of these particles, a radius of curvature $r_i$ and a radius R of a maximum inscribed circle were determined based on an image with an enlargement ratio of 100 times using "VHX-900," a digital microscope available from Keyence Corporation, and a roundness P was determined for each particle. An average value PA of the roundness P of the 50 particles was determined, and was defined as the average roundness.

[Absorbance]

A 0.10% by mass aqueous solution of each PVA (dispersant for suspension polymerization) was prepared, and for the measurement sample, an absorbance at an optical path length of 10 mm and a wavelength of 280 nm (UV 280 nm) and an absorbance at the same optical path length and a wavelength of 320 nm (UV 320 nm) were measured with a UV spectrophotometer ("UV2100," available from Shimadzu Corporation). The PVAs for which these absorptions can be confirmed were assumed to have the structure represented by the above formula 1.

By the above-described sieving, particles A which had a particle diameter of 500 μm or more and particles B which had a particle diameter of 220 μm or less were sorted out from the dispersant for suspension polymerization. For each of the particles A and the particles B, a 0.10% by mass aqueous solution was prepared, and absorbances (an absorbance A and an absorbance B) of the measurement samples at the optical path length of 10 mm and the wavelength of 320 nm were measured with a UV spectrophotometer ("UV2100," available from Shimadzu Corporation).

[Evaluation Method]

(1) Average Particle Diameter (MGS)

With regard to the vinyl polymer particles obtained, a particle size distribution was measured using a JIS standard sieve by a dry sieving method described in JIS Z 8815: 1994. The results were plotted into the Rosin-Rammler distribution equation to calculate the average particle diameter. Based on the measured average particle diameter, evaluation was carried out according to the following criteria.

5: less than 150 μm
4: 150 μm or more and less than 160 μm
3: 160 μm or more and less than 170 μm
2: 170 μm or more and less than 180 μm
1: 180 μm or more (2) Plasticizer Absorbency (CPA)

With regard to the vinyl polymer particles obtained, an amount of absorption of dioctyl phthalate at 23° C. was measured by a method described in ASTM-D3367-75. Based on the measured plasticizer absorption, evaluation was carried out according to the following criteria.

5: 28% or more
4: 26% or more and less than 28%
3: 24% or more and less than 26%
2: 22% or more and less than 24%
1: less than 22%

Example 1: Production of Dispersant for Suspension Polymerization 1 Containing PVA 1

Into a 250 L reaction vessel equipped with a stirrer, a reflux condenser, a nitrogen inlet tube, a comonomer dropping port, and an addition port for an initiator were charged 80 kg of vinyl acetate and 20 kg of methanol (80% by mass vinyl acetate: 20% by mass methanol), and replacement with nitrogen in the system was carried out for 30 min while bubbling nitrogen. Elevation of the temperature of the reaction vessel was started, and 1.85 kg of acetaldehyde (2.3% by mass with respect to the vinyl acetate) and 43 g of 2,2'-azobisisobutyronitrile (AIBN) were added to initiate the polymerization when an internal temperature of 60° C. was attained. When a polymerization rate reached 50%, cooling was performed to stop the polymerization. A solid content concentration at the time of stopping the polymerization was 39.3% by mass. Subsequently, unreacted vinyl acetate monomer was eliminated while adding methanol at 30° C. under reduced pressure at intervals to obtain a methanol solution of polyvinyl acetate (PVAc). Furthermore, 0.465 kg of an alkali solution (10% by mass sodium hydroxide in methanol solution) was added to 57.1 kg of a methanol solution of PVAc prepared by adding methanol (concentration: 35% by mass; 20.0 kg of PVAc in the solution) to the solution thus obtained, and saponification was carried out (a PVAc concentration in the saponification solution was 30% by mass, and a molar ratio of sodium hydroxide to the vinyl acetate units in the PVAc was 0.005). Gelatinous matter (a resin solid) was produced about 1 min after the alkali solution was added, and then the gelatinous matter was ground with a grinder. The ground matter was left to stand at 40° C. for 1 hour to allow saponification to proceed, and then 50 kg of methyl acetate was added thereto to neutralize remaining alkali. After confirming the completion of neutralization using a phenolphthalein indicator, the mixture was filtered to obtain a white solid, 200 kg of methanol was added thereto, and the solution was left to stand at room temperature for 3 hrs to permit washing. After this washing operation was repeated three times, a white solid obtained by deliquoring through centrifugation was left to stand in a dryer at 65° C. for 2 days, whereby a coarse powder of PVA 1 was obtained. The degree of polymerization of PVA 1 was 800, and the degree of saponification was 72.0 mol %.

Next, the coarse powder of PVA 1 was charged into "FKM130D," a Lodige mixer equipped with a Becker shovel available from Chuo Kiko Co., Ltd. A heat treatment was performed at a processing temperature of 120° C. for a processing time period of 3.5 hrs at a rotational speed of 160 rpm in a nitrogen atmosphere, whereby a dispersant for suspension polymerization 1 was obtained having an average particle diameter of 650 μm and an average roundness of 0.35.

Examples 2 to 16 and Comparative Examples 1 to 4

Dispersants for suspension polymerization 2 to 16 containing PVAs 2 to 16, respectively, and dispersants for suspension polymerization 1' to 4' containing PVAs 1' to 4', respectively, were obtained by operations similar to that of Example 1, except that the conditions were as described in Table 1.

The degree of polymerization (viscosity-average degree of polymerization) and the degree of saponification of each of the PVAs obtained in Examples 1 to 16 and Comparative Examples 1 to 4, and the average particle diameter, the percentage content of particles which have the particle diameter of 100 to 1,000 μm, and the average roundness of each dispersant for suspension polymerization (PVA) were measured by the above-described methods. Furthermore, with regard to each dispersant for suspension polymerization (PVA), the absorbance (UV 280), the absorbance (UV 320), and the absorbance A and the absorbance B were measured by the above-described methods. These measured values, and ratios of the absorbance A to the absorbance B (A/B) are shown in Table 2.

Evaluations

Particles of polyvinyl chloride, being a vinyl polymer, were obtained by the following method using each of the dispersants for suspension polymerization obtained in Examples 1 to 16 and Comparative Examples 1 to 4.

Into an autoclave having a capacity of 5 L was charged 1390 g of an aqueous solution in which 0.94 g (1000 ppm with respect to the vinyl chloride monomer) of each dispersant for suspension polymerization shown in Table 2 was dissolved. Subsequently, 1.5 g of a 70% by mass toluene solution of diisopropyl peroxydicarbonate was charged into the autoclave. Oxygen was removed by degassing until the pressure in the autoclave reached 0.0067 MPa. Thereafter, 940 g of vinyl chloride was charged, the temperature of the contents in the autoclave was elevated to 57° C., and suspension polymerization was started under stirring. The pressure in the autoclave at the time of starting the polymerization was 0.83 MPa. When 4 hrs passed from the start of the suspension polymerization and the pressure in the autoclave reached 0.65 MPa, the polymerization was stopped, and unreacted vinyl chloride was removed. Thereafter, a polymerization slurry was taken out and dried at 65° C. overnight to give vinyl chloride polymer particles.

With regard to the vinyl chloride polymer particles (vinyl polymer particles) obtained, the average particle diameter (MGS) and the plasticizer absorbency (CPA) were evaluated by the above-described methods. The results are shown in Table 2.

TABLE 1

| | Polymerization conditions | | | | Saponification conditions | |
|---|---|---|---|---|---|---|
| | vinyl acetate % by mass | methanol % by mass | modifier (acetaldehyde) % by mass (with respect to vinyl acetate) | degree of polymerization % | PVAc concentration % by mass | NaOH molar ratio — |
| Example 1 | 80 | 20 | 2.3 | 50 | 30 | 0.005 |
| Example 2 | 80 | 20 | 2.3 | 50 | 30 | 0.005 |
| Example 3 | 80 | 20 | 2.3 | 50 | 30 | 0.005 |
| Example 4 | 80 | 20 | 2.3 | 50 | 30 | 0.005 |
| Example 5 | 80 | 20 | 2.3 | 50 | 30 | 0.005 |
| Example 6 | 75 | 25 | 2.8 | 50 | 30 | 0.005 |
| Example 7 | 68 | 32 | 3.4 | 50 | 30 | 0.005 |
| Example 8 | 95 | 5 | 1.5 | 50 | 30 | 0.005 |
| Example 9 | 100 | 0 | 1.2 | 50 | 30 | 0.005 |
| Example 10 | 80 | 20 | 2.3 | 50 | 30 | 0.004 |
| Example 11 | 80 | 20 | 2.3 | 50 | 30 | 0.003 |
| Example 12 | 80 | 20 | 2.3 | 50 | 30 | 0.008 |
| Example 13 | 80 | 20 | 2.3 | 50 | 30 | 0.010 |
| Example 14 | 80 | 20 | 2.3 | 50 | 30 | 0.005 |
| Example 15 | 80 | 20 | 2.3 | 50 | 30 | 0.005 |
| Example 16 | 80 | 20 | 2.3 | 50 | 30 | 0.005 |
| Comparative Example 1 | 80 | 20 | 2.3 | 50 | 30 | 0.005 |
| Comparative Example 2 | 80 | 20 | 2.3 | 50 | 30 | 0.005 |
| Comparative Example 3 | 80 | 20 | 2.3 | 50 | 30 | 0.005 |
| Comparative Example 4 | 50 | 50 | — | 50 | 30 | 0.003 |

| | Heat treatment conditions | | | Produced material | |
|---|---|---|---|---|---|
| | device — | processing time period hrs | processing temperature ° C. | PVA — | dispersant — |
| Example 1 | Lödige mixer | 3.5 | 120 | PVA 1 | dispersant 1 |
| Example 2 | Lödige mixer | 2.5 | 120 | PVA 2 | dispersant 2 |
| Example 3 | Lödige mixer | 5.0 | 110 | PVA 3 | dispersant 3 |
| Example 4 | Lödige mixer | 1.5 | 120 | PVA 4 | dispersant 4 |
| Example 5 | Lödige mixer | 8.0 | 100 | PVA 5 | dispersant 5 |
| Example 6 | Lödige mixer | 3.0 | 120 | PVA 6 | dispersant 6 |
| Example 7 | Lödige mixer | 3.0 | 120 | PVA 7 | dispersant 7 |
| Example 8 | Lödige mixer | 3.0 | 120 | PVA 8 | dispersant 8 |
| Example 9 | Lödige mixer | 3.0 | 120 | PVA 9 | dispersant 9 |
| Example 10 | Lödige mixer | 3.0 | 120 | PVA 10 | dispersant 10 |
| Example 11 | Lödige mixer | 3.5 | 120 | PVA 11 | dispersant 11 |
| Example 12 | Lödige mixer | 3.0 | 120 | PVA 12 | dispersant 12 |
| Example 13 | Lödige mixer | 3.0 | 120 | PVA 13 | dispersant 13 |
| Example 14 | Pam Apex mixer | 4.0 | 120 | PVA 14 | dispersant 14 |
| Example 15 | ribbon mixer | 6.0 | 100 | PVA 15 | dispersant 15 |
| Example 16 | rotary kiln | 6.0 | 100 | PVA 16 | dispersant 16 |

TABLE 1-continued

| | | | | | |
|---|---|---|---|---|---|
| Comparative Example 1 | hot-air dryer | 3.0 | 120 | PVA 1' | dispersant 1' |
| Comparative Example 2 | Henschel mixer | 5.0 | 110 | PVA 2' | dispersant 2' |
| Comparative Example 3 | not processed | 0 | — | PVA 3' | dispersant 3' |
| Comparative Example 4 | Lödige mixer | 3.5 | 120 | PVA 4' | dispersant 4' |

TABLE 2

| | | PVA | | | Dispersant | | | Absorbance |
|---|---|---|---|---|---|---|---|---|
| | | type — | degree of polymerization — | degree of saponification mol % | average particle diameter µm | percentage content (*) % by mass | average roundness — | UV 280 nm — |
| Example 1 | dispersant 1 | PVA 1 | 800 | 72.0 | 650 | 85 | 0.35 | 0.30 |
| Example 2 | dispersant 2 | PVA 2 | 800 | 72.0 | 580 | 92 | 0.25 | 0.25 |
| Example 3 | dispersant 3 | PVA 3 | 800 | 72.0 | 250 | 76 | 0.55 | 0.23 |
| Example 4 | dispersant 4 | PVA 4 | 800 | 72.0 | 950 | 60 | 0.16 | 0.22 |
| Example 5 | dispersant 5 | PVA 5 | 800 | 72.0 | 120 | 55 | 0.65 | 0.38 |
| Example 6 | dispersant 6 | PVA 7 | 650 | 72.0 | 630 | 95 | 0.32 | 0.30 |
| Example 7 | dispersant 7 | PVA 8 | 550 | 72.0 | 550 | 90 | 0.31 | 0.29 |
| Example 8 | dispersant 8 | PVA 9 | 1200 | 78.0 | 720 | 88 | 0.33 | 0.31 |
| Example 9 | dispersant 9 | PVA 10 | 1600 | 80.0 | 780 | 84 | 0.32 | 0.28 |
| Example 10 | dispersant 10 | PVA 11 | 800 | 65.0 | 600 | 91 | 0.29 | 0.26 |
| Example 11 | dispersant 11 | PVA 12 | 800 | 55.0 | 630 | 89 | 0.25 | 0.27 |
| Example 12 | dispersant 12 | PVA 13 | 800 | 88.0 | 700 | 84 | 0.22 | 0.25 |
| Example 13 | dispersant 13 | PVA 14 | 800 | 95.0 | 850 | 80 | 0.20 | 0.24 |
| Example 14 | dispersant 14 | PVA 15 | 800 | 72.0 | 630 | 90 | 0.35 | 0.28 |
| Example 15 | dispersant 15 | PVA 17 | 800 | 72.0 | 980 | 55 | 0.24 | 0.23 |
| Example 16 | dispersant 16 | PVA 18 | 800 | 72.0 | 1160 | 50 | 0.18 | 0.22 |
| Comparative Example 1 | dispersant 1' | PVA 1' | 800 | 72.0 | 1260 | 45 | 0.08 | 0.19 |
| Comparative Example 2 | dispersant 2' | PVA 2' | 800 | 72.0 | 350 | 70 | 0.18 | 0.29 |
| Comparative Example 3 | dispersant 3' | PVA 3' | 800 | 72.0 | 2300 | 20 | 0.06 | 0.18 |
| Comparative Example 4 | dispersant 4' | PVA 4' | 800 | 72.0 | 640 | 80 | 0.34 | <0.01 |

| | Absorbance | | | | Evaluation | |
|---|---|---|---|---|---|---|
| | UV 320 nm — | A (UV 320 nm) — | B (UV 320 nm) — | A/B — | MGS — | CPA — |
| Example 1 | 0.28 | 0.27 | 0.28 | 0.96 | 5 | 4 |
| Example 2 | 0.24 | 0.23 | 0.25 | 0.92 | 5 | 4 |
| Example 3 | 0.23 | 0.22 | 0.24 | 0.92 | 5 | 4 |
| Example 4 | 0.16 | 0.15 | 0.18 | 0.83 | 4 | 4 |
| Example 5 | 0.39 | 0.35 | 0.40 | 0.88 | 3 | 4 |
| Example 6 | 0.29 | 0.28 | 0.29 | 0.97 | 3 | 5 |
| Example 7 | 0.27 | 0.26 | 0.27 | 0.96 | 2 | 5 |
| Example 8 | 0.33 | 0.32 | 0.33 | 0.97 | 4 | 3 |
| Example 9 | 0.30 | 0.27 | 0.33 | 0.82 | 3 | 2 |
| Example 10 | 0.25 | 0.24 | 0.25 | 0.96 | 3 | 5 |
| Example 11 | 0.27 | 0.26 | 0.28 | 0.93 | 2 | 5 |
| Example 12 | 0.25 | 0.24 | 0.25 | 0.96 | 3 | 3 |
| Example 13 | 0.24 | 0.22 | 0.25 | 0.88 | 3 | 2 |
| Example 14 | 0.28 | 0.27 | 0.29 | 0.93 | 5 | 4 |
| Example 15 | 0.23 | 0.22 | 0.24 | 0.92 | 4 | 4 |
| Example 16 | 0.22 | 0.21 | 0.24 | 0.88 | 2 | 4 |
| Comparative Example 1 | 0.16 | 0.15 | 0.22 | 0.68 | 1 | 3 |
| Comparative Example 2 | 0.28 | 0.20 | 0.30 | 0.67 | 1 | 4 |
| Comparative Example 3 | 0.16 | 0.15 | 0.24 | 0.63 | 1 | 3 |
| Comparative Example 4 | <0.01 | <0.01 | <0.01 | — | 1 | 1 |

(*) 1: Percentage content of particles having particle diameter of 100 to 1,000 µm As shown in Table 2, the absorbance ratios (A/B) of the dispersants for suspension polymerization of Examples 1 to 16 were 0.7 or more and 1.2 or less; in the case of using these dispersants for suspension polymerization, vinyl polymer particles having a small particle diameter for which the average particle diameter (MGS) was evaluated as 2 or more were able to be obtained.

On the other hand, in the case of using the dispersants for suspension polymerization of Comparative Examples 1 to 3, which had an absorbance ratio (A/B) of less than 0.7, and the dispersant for suspension polymerization of Comparative Example 4, which does not contain the PVA having the structure represented by the formula 1, the average particle diameter (MGS) was evaluated as 1, and vinyl polymer particles having a small particle diameter were not able to be obtained. Furthermore, by performing a heat treatment using a specified device on the PVA having a carbonyl group, a dispersant for suspension polymerization having an absorbance ratio (A/B) of 0.7 or more and 1.2 or less was obtained. The dispersant for suspension polymerization which was subjected to the heat treatment using the specified device and had the absorbance ratio (A/B) of 0.7 or more and 1.2 or less had an average roundness of 0.1 or more.

It is revealed from Table 2 and the like that the particle diameter of the dispersant for suspension polymerization, the degree of polymerization and the degree of saponification of the PVA, and the like also have an influence on the performance of the dispersant for suspension polymerization. For example, with regard to Examples 1 to 4, 8, 14, and 15, in which the degree of polymerization of the PVA was 700 or more and 1,500 or less, the degree of saponification was 68 mol % or more and 85 mol % or less, and the average particle diameter was 200 μm or more and 1,000 μm, the average particle diameter (MGS) was evaluated as 4 or 5, thereby enabling obtaining vinyl polymer particles having a smaller particle diameter. Moreover, with regard to Examples 1 to 3 and 14, in which the degree of polymerization of the PVA was 700 or more and 1,100 or less, the degree of saponification was 68 mol % or more and 85 mol % or less, and the percentage content of the particles which have the particle diameter of 100 μm or more and 1,000 μm or less was 65% by mass or more, or the average particle diameter was 200 μm or more and 800 μm, the average particle diameter (MGS) was evaluated as 5, thereby enabling obtaining vinyl polymer particles having a particularly small particle diameter. Furthermore, it can also be said that with regard to Examples 1 to 3 and 14, in which the average particle diameter (MGS) was evaluated as 5, the absorbance ratio (A/B) was 0.9 or more, the degree of polymerization of the PVA was 700 or more and 1,100 or less, the degree of saponification was 68 mol % or more and 85 mol % or less, and the percentage content of the particles which had a particle diameter of 100 μm or more and 1,000 μm or less of 60% by mass or more.

Moreover, it is revealed that, for example, by adjusting the degree of polymerization and the degree of saponification of the PVA, the plasticizer absorbency of the vinyl polymer particles to be obtained is also increased.

INDUSTRIAL APPLICABILITY

The dispersant for suspension polymerization of the one embodiment of the present invention can be used as a dispersant in subjecting a vinyl compound to suspension polymerization, and the like.

The invention claimed is:

1. A dispersant for suspension polymerization, comprising:

a vinyl alcohol polymer having a structure represented by formula 1:

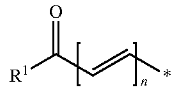

1 wherein, in the formula 1, $R^1$ represents an alkyl group having 1 to 4 carbon atoms; n is an integer of 1 to 10; and * denotes a site bonding to a part other than the structure represented by the formula 1 in the vinyl alcohol Polymer, wherein the dispersant comprises a powder having an average particle diameter of 100 μm or more 2,000 μm or less, wherein the dispersant comprises;

particles A which have a particle diameter of 500 μm or more, and particles B which have a particle diameter of 220 μm or less, wherein a ratio (A/B) of an absorbance A of a 0.1% by mass aqueous solution of the particles A at an optical path length of 10 mm and a wavelength of 320 nm to an absorbance B of a 0.1% by mass aqueous solution of the particles B at the optical path length of 10 mm and the wavelength of 320 nm is 0.7 or more and 1.2 or less, wherein an average value PA of a roundness P, represented by formula 2, of 50 particles arbitrarily extracted from the particles of the dispersant which have a particle diameter of 100 μm or more and 1,000 μm or less is 0.1 or more and 0.8 or less:

$$P=\left(\sum_{i=1}^{N} r_i\right)/NR \quad (2)$$

wherein, in the formula 2, $r_i$ represents a radius of curvature of each corner of a particle of the 50 particles arbitrarily extracted; R represents a radius of a maximum inscribed circle of the particle; and N represents a number of corners of the particle, wherein in a case in which the number of corners of the particle is 9 or more, the radii of curvature of eight corners, in increasing order from a smallest radius of curvature, are adopted, and N is set to 8.

2. The dispersant for suspension polymerization according to claim 1, wherein the vinyl alcohol polymer has a viscosity-average degree of polymerization of 500 or more and 1,500 or less, and a degree of saponification of 60 mol % or more and 90 mol % or less.

3. The dispersant for suspension polymerization according to claim 1, wherein a 0.1% by mass aqueous solution of the vinyl alcohol polymer has an absorbance at the optical path length of 10 mm and a wavelength of 280 nm of 0.05 or more, and an absorbance at the optical path length of 10 mm and the wavelength of 320 nm of 0.05 or more.

4. The dispersant for suspension polymerization according to claim 1, wherein a percentage content of particles which have a particle diameter of 100 μm or more and 1,000 μm or less is 50% by mass or more.

5. A method for producing the dispersant for suspension polymerization according to claim 1, the method comprising:

grinding a resin solid comprising the vinyl alcohol polymer to obtain a coarse powder; and processing surfaces of the coarse powder while heating.

6. A method for producing vinyl polymer particles, the method comprising subjecting a vinyl compound to suspension polymerization utilizing the dispersant for suspension polymerization according to claim 1.

7. The dispersant for suspension polymerization according to claim 1, wherein the ratio (A/B) is 0.75 or more and 1.1 or less.

8. The dispersant for suspension polymerization according to claim 1, wherein the ratio (A/B) is 0.8 or more and 1.05 or less.

9. The dispersant for suspension polymerization according to claim 1, wherein the ratio (A/B) is 0.82 or more and 1.03 or less.

10. The dispersant for suspension polymerization according to claim 1, wherein the ratio (A/B) is 0.85 or more and 1.0 or less.

11. The dispersant for suspension polymerization according to claim 1, wherein a 0.1% by mass aqueous solution of the vinyl alcohol polymer has an absorbance at the optical path length of 10 mm and a wavelength of 280 nm of 0.1 or more, and an absorbance at the optical path length of 10 mm and the wavelength of 320 nm of 0.1 or more.

12. The dispersant for suspension polymerization according to claim 1, wherein a 0.1% by mass aqueous solution of the vinyl alcohol polymer has an absorbance at the optical path length of 10 mm and a wavelength of 280 nm of 0.2 or more, and an absorbance at the optical path length of 10 mm and the wavelength of 320 nm of 0.2 or more.

13. The dispersant for suspension polymerization according to claim 1, wherein the average value PA of the roundness P is 0.15 or more and 0.7 or less.

14. The dispersant for suspension polymerization according to claim 1, wherein the particles B have a particle diameter of 212 μm or less.

15. The method according to claim 5, wherein the processing of surfaces of the coarse powder while heating is performed by a planetary mixer, a mixer, or both.

16. The method according to claim 5, wherein the processing of surfaces of the coarse powder while heating is performed for 10 min or longer and 20 hrs or shorter.

17. The method according to claim 5, wherein the processing of surfaces of the coarse powder while heating is performed for 30 min or longer and 12 hrs or shorter.

18. The method according to claim 5, wherein the processing of surfaces of the coarse powder while heating is performed at a temperature of 60° C. or higher and 160° C. or lower.

19. The method according to claim 5, wherein the processing of surfaces of the coarse powder while heating is performed at a temperature of 80° C. or higher and 140° C. or lower.

* * * * *